US012810666B2

(12) United States Patent
Nicol et al.

(10) Patent No.: US 12,810,666 B2
(45) Date of Patent: Nov. 24, 2026

(54) DEPLOYABLE DATA RECORDER SYSTEMS FOR AIRCRAFT

(71) Applicant: THE BOEING COMPANY, Arlington, VA (US)

(72) Inventors: Luke Nicol, Boulder, CO (US); Alvaro Torcal Sullivan, Aurora, CO (US); James Adam Watson, Newport Beach, CA (US); Monique Nicole Ness, Denver, CO (US); Nicholas James Reutter, Boulder, CO (US); Ethan Polacsek, Arvada, CO (US); Ryan Miro Salek, Arvada, CO (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/806,870

(22) Filed: Aug. 16, 2024

(65) Prior Publication Data

US 2026/0051209 A1 Feb. 19, 2026

(51) Int. Cl.

| | |
|---|---|
| ***G07C 5/08*** | (2006.01) |
| ***B64D 25/20*** | (2006.01) |
| ***B64D 45/00*** | (2006.01) |
| ***B64F 5/60*** | (2017.01) |
| ***G07C 5/00*** | (2006.01) |

(52) U.S. Cl.

CPC ........... *G07C 5/0858* (2013.01); *B64D 25/20* (2013.01); *B64D 45/00* (2013.01); *B64F 5/60* (2017.01); *G07C 5/008* (2013.01); *G07C 5/0808* (2013.01); *B64D 2045/0065* (2013.01); *B64D 2045/0085* (2013.01)

(58) Field of Classification Search

CPC ............ B64D 25/20; B64D 2045/0065; B64D 2045/0085

See application file for complete search history.

(56) References Cited

U.S. PATENT DOCUMENTS

| | | | | |
|---|---|---|---|---|
| 2,862,531 A * | 12/1958 | Walker | B64D 25/20 | 116/210 |
| 4,405,099 A * | 9/1983 | Bolen | B64D 25/20 | 244/33 |
| 8,493,715 B1 | 7/2013 | Angelucci | | |
| 8,670,879 B1 * | 3/2014 | Angelucci | B64D 45/00 | 361/679.01 |

(Continued)

FOREIGN PATENT DOCUMENTS

| | | |
|---|---|---|
| CA | 2292878 A1 | 6/2001 |
| JP | 4860809 B | 1/2012 |

*Primary Examiner* — William L Gmoser

(74) *Attorney, Agent, or Firm* — Moore IP Law

(57) ABSTRACT

An apparatus associated with a vehicle, includes a body, wherein the body includes a chamber. The apparatus further includes a buoyancy ring coupled to the body. The apparatus further includes a battery located within the chamber. The apparatus further includes a transmitter, wherein a portion of the transmitter is disposed within a recess of the body. The apparatus further includes a processor located within the chamber and coupled to a memory device, wherein the processor is configured to: receive a signal indicating detection of submersion of the vehicle in water, send a signal to switch a power source from the vehicle to the battery, send a signal to cause inflation of an inflatable bag, and cause the transmitter to send a data transmission.

20 Claims, 10 Drawing Sheets

(56) References Cited

U.S. PATENT DOCUMENTS

| | | | | |
|---|---|---|---|---|
| 8,801,033 | B2 | 8/2014 | Breed | |
| 9,440,749 | B1 | 9/2016 | Ye et al. | |
| 9,452,844 | B1 | 9/2016 | Ye et al. | |
| 9,738,398 | B1 * | 8/2017 | Wang | G01S 1/725 |
| 9,745,071 | B1 | 8/2017 | Wang et al. | |
| 9,771,160 | B2 | 9/2017 | Ye et al. | |
| 9,975,640 | B1 | 5/2018 | Wang et al. | |
| 10,661,909 | B2 | 5/2020 | Murphy et al. | |
| 10,780,997 | B1 * | 9/2020 | Bigelow | B64G 1/623 |
| 10,981,668 | B1 * | 4/2021 | Yin | B64D 45/00 |
| 2003/0051630 | A1 | 3/2003 | Katsuda et al. | |
| 2006/0054257 | A1 | 3/2006 | Mendenhall et al. | |
| 2012/0138741 | A1 * | 6/2012 | Fabre | G01S 5/0231 244/1 R |
| 2015/0323641 | A1 * | 11/2015 | Salinas | B60Q 5/005 701/3 |
| 2016/0257415 | A1 | 9/2016 | Ye et al. | |
| 2016/0257421 | A1 | 9/2016 | Ye et al. | |
| 2016/0318616 | A1 * | 11/2016 | Fischer | B64D 25/20 |
| 2017/0029128 | A1 | 2/2017 | Ye et al. | |
| 2018/0232970 | A1 * | 8/2018 | Satyanarayana | B64D 45/00 |
| 2019/0270523 | A1 * | 9/2019 | Murphy | G07C 5/085 |
| 2020/0013263 | A1 * | 1/2020 | Lee | G08B 5/002 |
| 2021/0001999 | A1 * | 1/2021 | Massa | G06T 3/4038 |

* cited by examiner

DEPLOYABLE DATA RECORDER SYSTEMS FOR AIRCRAFT

FIELD OF THE DISCLOSURE

The present disclosure is generally related to deployable data recorder systems for aircraft.

BACKGROUND

Flight recorders, encompassing both flight data recorders (FDRs) and cockpit voice recorders (CVRs), are essential components in modem aircraft. These electronic devices continuously capture critical information, playing an important role in the investigation of aviation events. FDRs record data transmitted between various aircraft systems, which provides insights into flight parameters, engine performance, and control inputs. CVRs record conversations and sounds within the cockpit, including pilot communications and ambient noises. Both types of recorders are engineered to withstand conditions like impact, fire, and water immersion to ensure data preservation for post-event analysis.

While some flight recorders exist that detach from the aircraft in shallow water for recovery, these deployable models have limitations that hinder their effectiveness. One challenge lies in the deployment process itself. The act of detaching from the aircraft can damage the recorder, causing it to sink or making it difficult to locate visually. Furthermore, maintaining these deployable recorders in optimal operational condition can be complex. Another issue is susceptibility to water damage. Despite being designed to withstand water immersion, existing models can still succumb to water damage, which may cause corruption of stored data. Also, low visibility of some deployed recorders can hinder quick location and recovery efforts. Accordingly, there is a need for a deployable flight recorder that is easy to maintain, automatically deploys, remains afloat, does not fail due to water damage, and is visible from a distance when deployed.

SUMMARY

In a particular implementation, an apparatus associated with a vehicle includes a body having a chamber. The apparatus includes a buoyancy ring coupled to the body. The apparatus includes a battery located within the chamber. The apparatus includes a transmitter. A portion of the transmitter is disposed within a recess of the body. The apparatus further includes a processor located within the chamber and coupled to a memory device. The processor is configured to receive a signal indicating detection of submersion of the vehicle in water, send a signal to switch a power source from the vehicle to the battery, send a signal to cause inflation of an inflatable bag, and cause the transmitter to send a data transmission.

In another particular implementation, a system includes an aircraft. The system also includes a plurality of deployable data recorder systems coupled to the aircraft. Each deployable data recorder system is located at a different location in the aircraft. Each deployable data recorder system includes a body that has a chamber, a buoyancy ring coupled to the body, a battery located within the chamber, and a transmitter. A portion of the transmitter is disposed within a recess of the body. Each deployable data recorder system also includes a processor located within the chamber and coupled to a memory device. The processor is configured to receive a signal indicating detection of submersion of the vehicle in water, send a signal to switch a power source from the aircraft to the battery, send a signal to cause inflation of an inflatable bag, and cause the transmitter to send a data transmission.

In another particular implementation, a method of use of a deployable data recorder includes receiving, at a processor in a chamber of the deployable data recorder, flight data associated with an aircraft via a releasable connector. The method includes sending, from the processor in response to detection of a submersion of the aircraft in water, a signal to switch a power source from the aircraft to a battery in the chamber. The method includes sending, from the processor in response to detection of a submersion of the aircraft in water, a signal to cause inflation of an inflatable bag to deploy the deployable data recorder. The method also includes causing, via the processor, transmission of a data transmission via a transmitter in the deployable data recorder.

The features, functions, and advantages described herein can be achieved independently in various implementations or may be combined in yet other implementations, further details of which can be found with reference to the following description and drawings.

DETAILED DESCRIPTION

Figure 1:
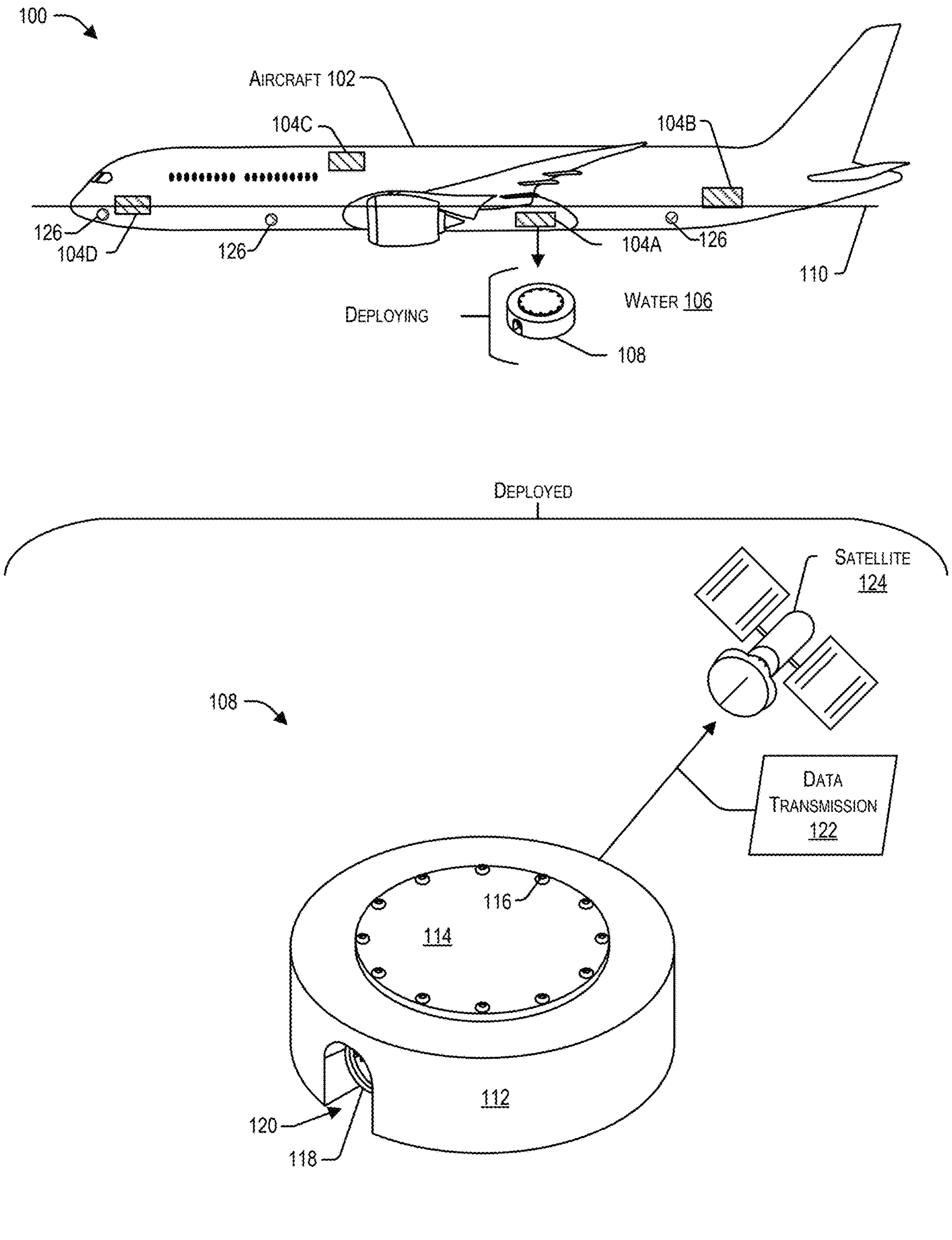
FIG. 1 is a diagram that illustrates a side view of an aircraft showing locations for deployable data recorders and a particular implementation of a deployable data recorder.

Aspects disclosed herein present systems, apparatus, and methods for deployable data recorders. Prior to being deployed, a deployable data recorder is in a compartment of an aircraft in a stored configuration with an inflatable bag. A releasable connector releasably coupled to a data connection of the aircraft allows transfer of flight data from the aircraft to the deployable data recorder. The data connection is also electrically coupled to a pressure sensor. When the airplane is located in water (e.g., an ocean) and pressure signals received from the pressure sensor via the data connection indicate that the aircraft is submerged in the water below a threshold depth, the deployable data recorder sends an activate signal to the inflatable bag to cause deployment of the deployable data recorder from the aircraft. Deployment of the deployable data recorder includes causing inflation of the inflatable bag to cause release of the deployable data recorder from the compartment and separation of the releasable connector from the data connection. Release of the deployable data recorder from the compartment allows the deployable data recorder to rise to a surface of the body of water.

The deployable data recorder includes a body and a buoyancy ring coupled to the body. The deployable data recorder, upon determining that the aircraft is below the threshold depth in the water based on the pressure signals from the pressure sensor, sends a signal to switch a power source from the aircraft to the battery. The deployable data recorder also sends the activate signal to cause inflation of the inflatable bag. The inflatable bag provides a force that causes the deployable data recorder to break through a panel of the aircraft and uncouple the releasable connector of the deployable data recorder from the releasable connector of the aircraft. The buoyancy ring is configured to aid in the flotation of the body and be of a vibrant color to facilitate visual detection of the deployable data recorder in the water.

The body includes a chamber with a memory device configured to store the flight data and at least a portion of a transmitter that sends a data transmission when the deployable data recorder is deployed. The chamber is also configured to be water resistant through the use of a top plate that includes at least two grooves, where each groove is configured to receive an O-ring and one or more openings configured to receive one or more fasteners to join the top plate to the body.

By using the techniques and systems described herein, the deployable data recorder has the technical advantages of staying afloat through the use of the buoyancy ring, having a chamber that is water resistant to protect the flight data, and being easy to visually detect from afar based on the buoyancy ring having a vibrant color. Another technical advantage of the deployable data recorder is that the power supply (e.g., lithium-ion battery) is replaceable.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple deployable data recorder systems 104 are illustrated and associated with reference numbers 104A, 104B, 104C, and 104D. When referring to a particular one of these deployable data recorder systems, such as the deployable data recorder system 104A, the distinguishing letter "A" is used. However, when referring to any arbitrary one of these deployable data recorder systems, the reference number 104 is used without a distinguishing letter.

Figure 10:
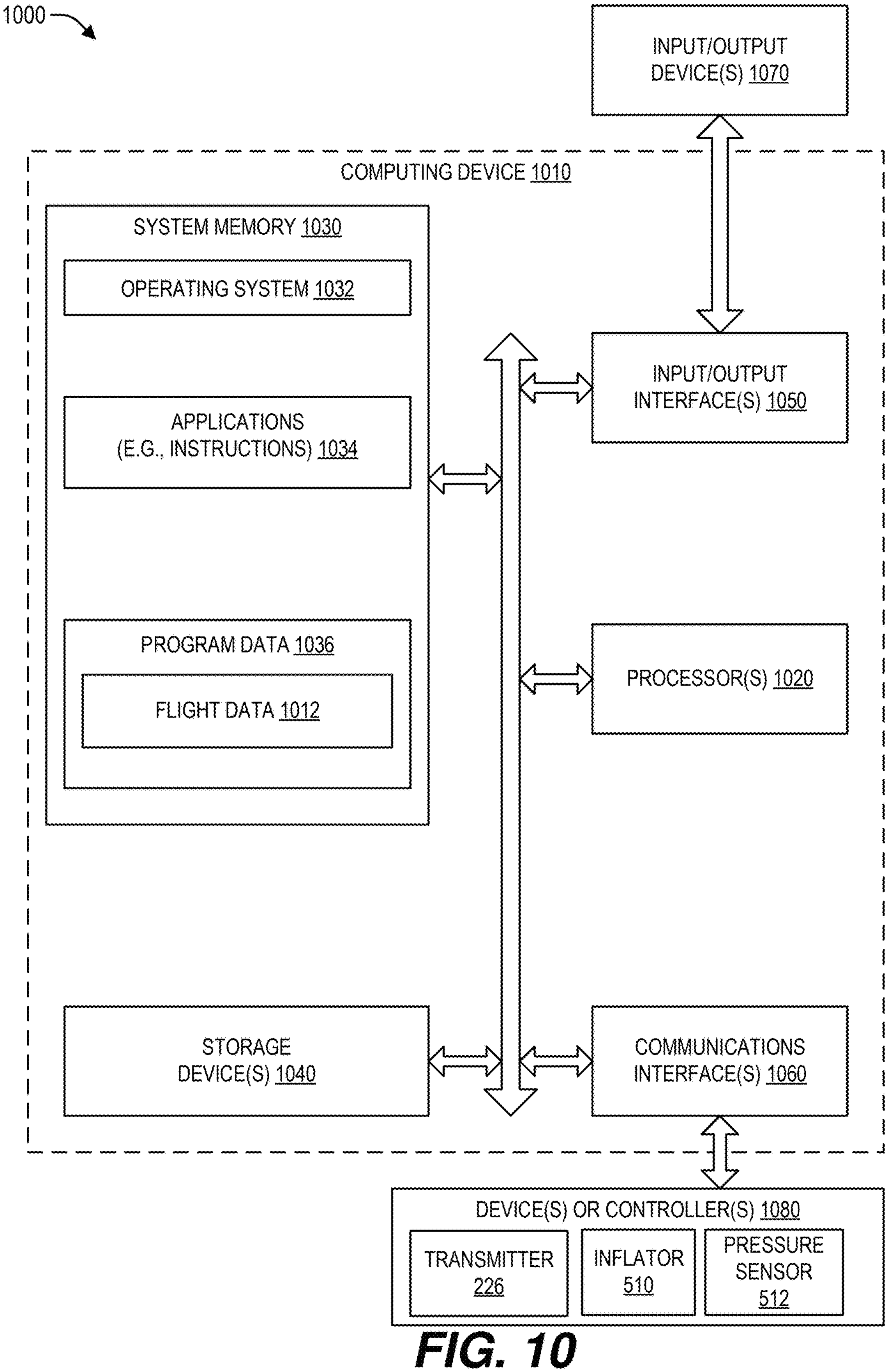
FIG. 10 is a diagram of electronic components of a deployable data recorder.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 10 depicts a computing device 1010 including one or more processors ("processor(s)" 1020 in FIG. 10), which indicates that in some implementations the computing device 1010 includes a single processor 1020 and in other implementations the computing device 1010 includes multiple processors 1020. For ease of reference herein, such features are generally introduced as "one or more" features and are subsequently referred to in the singular or optional plural (as typically indicated by "(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a system 100 that includes an aircraft 102 and a plurality of deployable data recorder systems 104. While FIG. 1 illustrates the aircraft 102, it should be noted that the aircraft 102 can be a different vehicle, such as an automobile, sea vessel, helicopter, train, and so forth.

The plurality of deployable data recorder systems 104 are located at several locations on the aircraft 102. FIG. 1 depicts four deployable data recorder systems 104A-D on a first side of the aircraft 102. In other implementations, the first side of the aircraft 102, and a second side of the aircraft 102, can have fewer than four deployable data recorder systems 104, or more than four deployable data recorder systems 104. Having several deployable data recorder systems 104 at different locations on the aircraft 102 greatly increases chances of recovery of one or more deployable data recorders 108 of the deployable data recorder systems 104 should the aircraft 102 end up in water 106.

Each deployable data recorder system 104 includes a compartment in the aircraft 102 covered by a panel and a deployable data recorder 108 in the compartment. The panels may or may not enable water 106 to enter the compartments if the aircraft 102 is located in water 106. The aircraft 102 includes one or more pressure sensors 126. The pressure sensors 126 may be located in the compartment with the deployable data recorder 108 or may be located at several locations elsewhere on the aircraft 102. When the aircraft 102 is located in water 106, pressure of the water 106 on a pressure sensor 126 above a threshold pressure causes deployment of a deployable data recorder system 104. Deployment causes separation of the deployable data recorder 108 from the aircraft 102. Deployment of a deployable data recorder system 104 causes inflation of an inflatable bag to press the deployable data recorder 108 against the panel to rupture or separate the panel from the aircraft 102 and expel the deployable data recorder 108. Before deployment, the deployable data recorder 108 is held in position in the compartment by an interference fit or by one or more fastener systems, and an impact force provided to the deployable data recorder 108 by the airbag during deployment separates the deployable data recorder 108 from the compartment.

In the example illustrated in FIG. 1, the aircraft 102 is partially submerged in the water 106. The deployable data recorder system 104A deploys to separate the deployable data recorder 108 from the aircraft 102. When the deployable data recorder 108 separates from the aircraft 102, the deployable data recorder 108 rises to a surface 110 of the water 106 due to buoyancy of the deployable data recorder 108.

The deployable data recorder 108 includes a top plate 114 and a body with a chamber. A processor, a power supply (e.g., battery), at least a first portion of a transmitter, a memory device, or a combination thereof, are positioned in the chamber. An antenna of the transmitter may be located outside of the chamber to facilitate transmission of signals. The chamber is configured to be water resistant to a depth that is greater than a threshold depth corresponding to a depth where deployment is initiated (e.g., 3 meters, 5 meters, 15 meters or some other depth) and to remain water resistant to inhibit water ingress after being subjected to impact forces due to deployment by the inflatable bag. The body includes a first opening configured to receive and be secured (e.g., by epoxy, silicon sealant, or both) to a releasable connector 118 configured to communicatively couple the deployable data recorder 108 to the aircraft 102. The body also includes a second opening configured to receive and be secured (e.g., by epoxy, silicon sealant, or both) to a portion of the antenna that passes through the chamber to connect to the first portion of the transmitter in the chamber of the body.

The top plate 114 includes a plurality of mount openings and one or more recesses. Fasteners 116 positioned in the mount openings and corresponding mount openings in the body couple the top plate 114 to the body. A first O-ring in a first recess in the top plate 114 and a second O-ring in a second recess in the top plate 114 form a water-resistant seal between an outside environment and the chamber.

The fasteners 116 pass through mount openings in the top plate 114 and into corresponding mount openings in the body. In some implementations, the top plate 114 can be affixed to the body using an interference fit, fasteners 116, adhesives, welding, other types of connections, or combinations thereof. The affixation of the top plate 114 to the body can be reversible or irreversible. For example, the fasteners 116 (e.g., screws) can provide reversible attachment of the top plate 114, while an interference fit or a weld may be an irreversible connection that only permits access to the chamber prior to attachment of the top plate 114. The top plate 114, the body, or both, includes a lightweight metal (e.g., aluminum or an aluminum alloy), low-density polyethylene (LDPE), cross-linked polyethylene (PEX), acrylonitrile butadiene styrene (ABS), polypropylene (PP), rubber-modified PP, other material, or combinations thereof.

The deployable data recorder 108 includes a buoyancy ring 112 that is coupled to the body of the deployable data recorder 108. The buoyancy ring 112 comprises a material that enables the deployable data recorder 108 to have a positive buoyancy to enable floatation of the deployable data recorder 108. For example, the material can include marine grade polyurethane (PE) foam, ethylene vinyl acetate (EVA) foam, polypropylene (PP) foam, santoprene, cork, or a combination thereof. In some implementations, mold release is applied to a mold, and the body is placed in the mold. The releasable connector 118 is secured in the first opening of the body and a portion of the mold corresponds to a passage 120 that enables a data connection of the aircraft 102 to be connected to the releasable connector 118. Also, the antenna is attached to the first portion of the transmitter in the chamber through the second opening. A two-part polyurethane based marine foam is mixed, optionally a dye is added to the mixture during mixing, the mixture is poured in the mold, and the mixture is allowed to cure to form foam. The foam adheres to the body obviating a need for use of adhesive to secure the buoyancy ring 112 to the body. The top of the mold may be open to allow the foam to rise. After curing is complete, excess foam is cut away.

The buoyancy ring 112 can have a surface area that is large enough to have a high visibility aspect for easy recovery by search and rescue teams. The buoyancy ring 112 can be painted, formed of a material having a vibrant color, or both, to facilitate visual detection of the deployable data recorder 108. For example, the vibrant color can include international orange, fluorescent yellow or green, rescue red, royal blue, lime green, hot pink, florescent orange, or a combination thereof. In some implementations, infrared patches are adhered to the buoyancy ring 112, the top plate 114, or both, to facilitate finding the deployable data recorder 108 after deployment.

The buoyancy ring 112 includes the passage 120 configured to enable the releasable connector 118 to be releasably coupled to the data connection of the aircraft 102. The buoyancy ring 112 is configured to cause the deployable data recorder 108 to have an upright orientation in the water 106.

The releasable connector 118 is electrically coupled to the processor. The releasable connector 118 is also configured to be releasably coupled to the data connection of the aircraft 102 before inflation of the inflatable bag. In one aspect, the releasable connector 118 is configured to magnetically couple to a releasable connector plug of the data connection. The coupling of the connectors enables the processor to couple to a data system of the aircraft 102 to receive flight data associated with the aircraft 102. For example, the flight data includes recorded data sent to and received from various electronic systems on the aircraft 102, cockpit conversations and other sounds in the aircraft cockpit, as well as radio communications between personnel in the cockpit and others, or both. In response to receiving the flight data, the processor is configured to store the flight data in the memory device.

In other implementations, the aircraft 102 transmits a short-range broadcast of data to be stored by the deployable data recorder 108 of the deployable data recorder systems 104. A receiver in the body receives the broadcast of the data and the processor causes the data to be saved in the memory device. When pressure data received from the pressure sensor 126 indicates to deploy the deployable data recorder 108, the receiver is powered down to prevent power loss due to use of the receiver.

The pressure sensor 126 is coupled to the aircraft 102. In some implementations, each deployable data recorder system 104 includes an individual pressure sensor. In other implementations, two or more deployable data recorder systems 104 utilize a common pressure sensor 126. The pressure sensor 126 is secured to a location of the aircraft 102 that will fill with water should the aircraft 102 land in the water 106 and sink. The pressure sensor 126 is configured to generate pressure data and send the pressure data to the processor. In response to receiving the pressure data, the processor is configured to determine whether the pressure data indicates that the pressure sensor 126 is at or below a threshold depth of water (e.g., 3 meters or some other depth). When the processor determines that the pressure sensor 126 is submerged in the water 106 below the threshold depth, the processor sends a signal to switch a power source from the aircraft 102 to the power source (e.g., battery). In some implementations, the processor sends an activate signal to cause inflation of the inflatable bag. In some implementations, the determination that the pressure sensor 126 is submerged in the water 106 at or below the threshold depth is with a certainty of ten sigma.

The deployable data recorder 108 includes the transmitter with the antenna located outside of the chamber and the first portion of the transmitter located within the chamber of the body. In some implementations, the antenna is positioned in a casing (e.g., a polycarbonate casing) and the antenna is coupled to the first portion of the transmitter through the second opening in the body. The second opening is sealed using epoxy, silicon sealant, or both, and the buoyancy ring 112 is formed so that the antenna is embedded within the foam of the buoyancy ring 112. The transmitter is configured to send a data transmission 122 via the antenna to one or more receivers 124 (e.g., satellites, a receiver on a search vehicle, etc.) to facilitate location of the deployable data recorder 108 based on the data transmission 122. In some implementations, the data transmission 122 includes location information, such as a location signal, for the deployable data recorder 108. In other implementations, a strength of the data transmission 122, triangulation, other location techniques, or combinations thereof, are used to determine the location of the deployable data recorder 108 based on received data transmissions 122. Location data for the deployable data recorder 108 is provided to one or more search crews assigned to find the deployable data recorder 108.

The deployable data recorder 108 has one or more technical advantages of staying afloat through the use of the buoyancy ring 112, having a chamber that is water resistant to protect the flight data, and being easy to visually detect from afar based on the buoyancy ring 112 having a vibrant color. Another technical advantage is that deployment of the deployable data recorder 108 is implemented by a device (e.g., the inflatable bag) that is not an integral part of the deployable data recorder 108, which simplifies the deployable data recorder 108 and increases reliability of the deployable data recorder 108.

Figure 2:
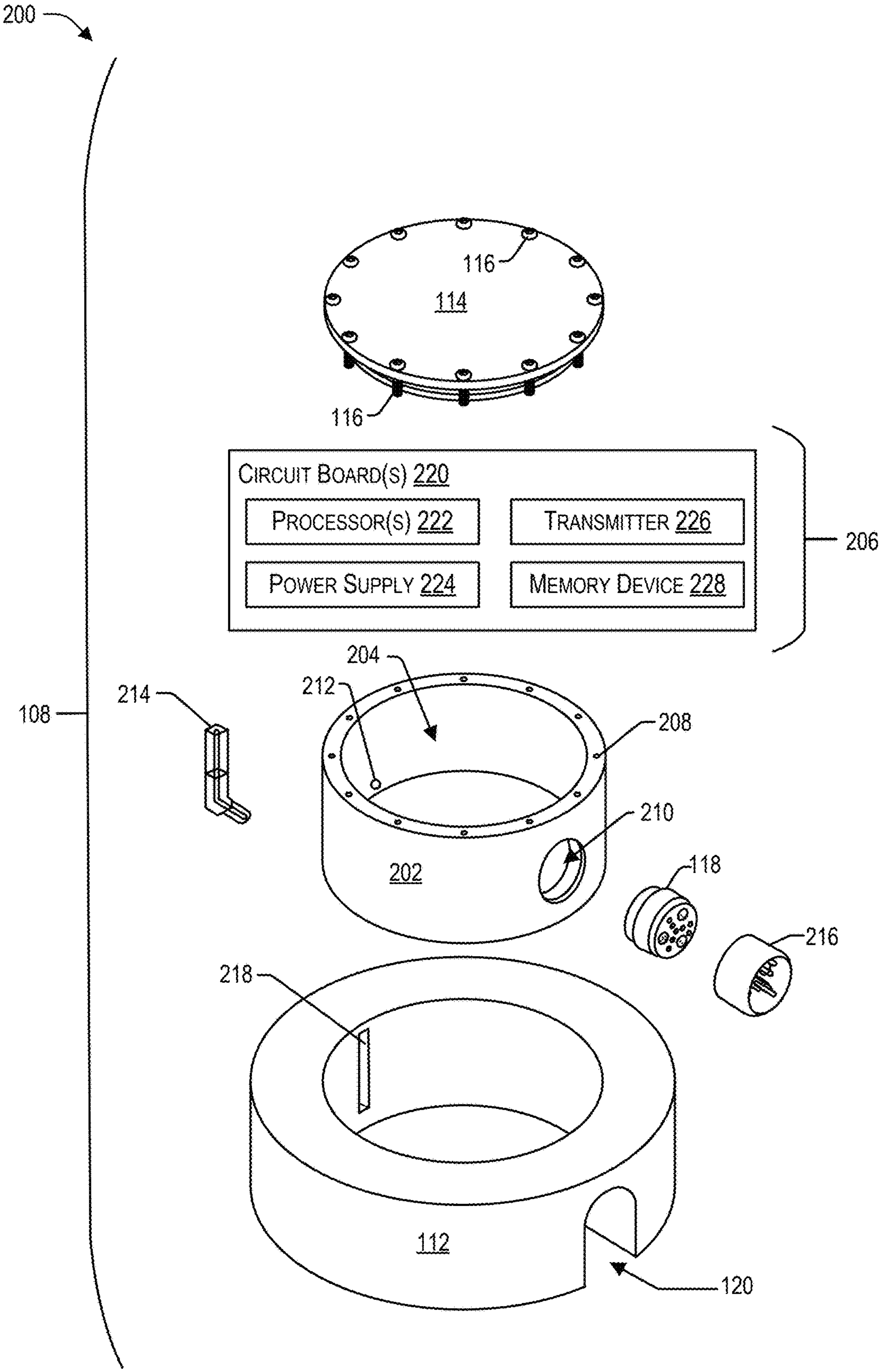
FIG. 2 is a particular implementation that illustrates a deployable data recorder of FIG. 1 and one or more components of the deployable data recorder with a block diagram depicting the electronic components.

FIG. 2 depicts a particular implementation of a system 200 that illustrates the deployable data recorder 108 of FIG. 1 and one or more components included with the deployable data recorder 108 with a block diagram depicting the electronic components 206. The deployable data recorder 108 includes the top plate 114 and a body 202. The body 202 includes a chamber 204 that is configured to include one or more electronic components 206. The one or more electronic components 206 can include one or more circuit boards 220 with one or more processors 222, a power supply 224, a transmitter 226, a memory device 228, other components, or a combination thereof, electrically coupled to the circuit board(s) 220, wiring of the releasable connector 118, and a transmitter antenna 214. The chamber 204 is configured to be water resistant to a depth that is greater than the threshold depth to inhibit water ingress due to deployment and immersion in water.

The processor(s) 220 are configured to execute one or more stored instructions. For example, the processor(s) 222 are configured to receive a signal indicating detection of submersion of the pressure sensor in water at or below the threshold depth. For example, the pressure sensor is configured to generate pressure data and send the pressure data to the processor(s) 222. In response to receiving the pressure data, the processor(s) 222 determine whether the pressure sensor is submerged in water below the threshold depth. In response to the deployable data recorder 108 being at or below the threshold depth, the processor(s) 222 send the signal to switch from use of power supplied through the releasable connector 118 from the aircraft 102 to the power supply 224. In some implementations, in response to the pressure sensor being at or below the threshold depth, the processor(s) 222 send an inflate signal to cause inflation of the inflatable bag. The pressure sensor sends a pressure signal to the processor(s) 222, and the processor(s) 222 determine whether the pressure signal indicates that the pressure sensor is at or below the threshold depth.

The processor(s) 222 may comprise one or more cores. The processor(s) 222 may include general purpose microprocessors, microcontrollers, application-specific integrated circuits (ASICs), digital signal processors (DSPs), and so forth. One or more clocks may provide information indicative of date, time, ticks, and so forth. For example, the processor(s) 222 may use data from a particular clock to associate a particular interaction, such as receipt of the flight data or deployment of the deployable data recorder 108, with a particular point in time.

The power supply 224 is configured to provide electrical power to the components of the deployable data recorder 108. The power supply 224 may include or correspond to batteries, capacitors, fuel cells, photovoltaic cells, wireless power receivers, conductive couplings suitable for attachment to an external power source such as provided by an electric utility, and so forth. The battery of the power supply 224 on board the deployable data recorder 108 may be charged wirelessly, such as through inductive or capacitive power transfer. In another implementation, electrical contacts may be used to recharge the batteries of the deployable data recorder 108. When the deployable data recorder 108 is on the aircraft, the power provided by the power supply 224 is provided via a power system of the aircraft. When the deployable data recorder 108 is deployed, the power supply 224 is able to provide power to operate the deployable data recorder 108 for a significant amount of time (e.g., 72 hours, 5 days, 1 week, two weeks, or some other amount of time). In some implementations, the power supply 224 is configured to be a component of a voltage management and distribution circuit, which is coupled to the processor(s) 222 and an auxiliary power source. The auxiliary power source may include or correspond to batteries, capacitors, fuel cells, photovoltaic cells, wireless power receivers, conductive couplings suitable for attachment to an external power source such as provided by an electric utility, and so forth. In other implementations, the power supply 224 is configured to receive instructions from the processor(s) 222 to control an analog control loop that is configured to power the one or more components of the deployable data recorder 108.

The antenna 214 of the transmitter 226 is configured to broadcast the data transmission to one or more receivers (e.g., satellites or receivers associated with search vehicles). In some implementations, the antenna 214 is configured to transmit the data transmission as a location signal at different frequencies, modulation, phase, output power levels, time intervals, or a combination thereof, based on a passage of time or receipt of a response signal. For example, the transmitter 226 can be configured to send, via the antenna 214, the data transmission at a first power level every thirty (30) seconds for a first period of 24 hours after deployment, at a second power level every sixty (60) seconds after the first period of 24 hours for a second period of 24 hours, and at a third power level every ninety (90) seconds thereafter. In another example, the transmitter 226 is configured to send, via the antenna 214, the data transmission at a particular time interval, where each time interval is associated with sending the data transmission at a particular frequency and power output level.

The memory device 228 can include one or more non-transitory, computer-readable storage media (CRSM). The CRSM can be any one or more of an electronic storage medium, a magnetic storage medium, an optical storage medium, a quantum storage medium, a mechanical computer storage medium, and so forth. The memory device 228 stores aircraft data received from the aircraft during operation of the aircraft. The memory device 228 is sized to store data corresponding to at least a particular number of most recent hours of operation of the aircraft (e.g., at least 10 hours of operation data, at least 60 hours of operation data, at least 120 hours of operation data, or some other number of hours of operation data). When the memory device 228 is filled with operation data of the aircraft, new operation data for the aircraft overwrites the oldest operation data of the aircraft.

The deployable data recorder 108 includes the top plate 114. The top plate 114 may include a plurality of mount openings and one or more recesses. Fasteners 116 positioned in the mount openings and corresponding mount openings 208 in the body 202 couple the top plate 114 to the body 202, and a first O-ring in a first recess in the top plate 114 and a second O-ring in a second recess in the top plate 114 forms a water-resistant seal between an outside environment and the chamber 204.

The fasteners 116 pass through mount openings in the top plate 114 and into corresponding mount openings 208 in the body 202. In some implementations, the top plate 114 can be affixed to the body 202 using an interference fit, the fasteners 116, adhesives, welding, other types of connections, or combinations thereof. The affixation of the top plate 114 to the body 202 can be reversible or irreversible. For example, the fasteners 116 (e.g., screws) can be designed to allow for the insertion or removal of the fasteners 116, while an interference fit may include a tab that cannot be released once it has been engaged. In another example, an interference fit features may include tabs, grooves, ridges, latches, and so forth. The top plate 114, the body 202, or both, may be formed of aluminum or an aluminum alloy, low-density polyethylene (LDPE), cross-linked polyethylene (PEX), acrylonitrile butadiene styrene (ABS), polypropylene (PP), rubber-modified PP, other material, or a combination thereof.

The body 202 includes an opening 210. The releasable connector 118 is positioned in the opening 210 and sealed (e.g., by epoxy, silicon sealant, or both) to the body 202. The releasable connector 118 is electrically coupled to the processor(s) 222. The releasable connector 118 is also configured to be releasably coupled to a releasable connector plug 216 (e.g., data connection) of the aircraft 102 before inflation of the inflatable bag. In one aspect, the releasable connector 118 is configured to magnetically couple to the releasable connector plug 216 of the aircraft 102. The coupling of the connectors enables the processor to couple to a data system of the aircraft 102 to receive pressure data from the pressure sensor and receive flight data associated with the aircraft. For example, the flight data includes recorded data sent to and received from various electronic systems on the aircraft 102, cockpit conversations and other sounds in the aircraft cockpit, as well as radio communications between personnel in the cockpit and others, or both. In response to receiving the flight data, the processor is configured to store the flight data in the memory device.

The buoyancy ring 112 is coupled to the body 202. The buoyancy ring may be formed around the body 202, adhered to the body 202, or otherwise be attached to the body 202. The buoyancy ring 112 comprises a material that enables the deployable data recorder 108 to have a positive buoyancy to enable floatation of the deployable data recorder 108. The buoyancy ring 112 can have a surface area that is large enough to have a high visibility aspect for easy recovery by search and rescue teams. The buoyancy ring 112 can be a vibrant color to facilitate visual detection of the deployable data recorder 108. In some implementations, the buoyancy ring 112 includes infrared patches located on a surface of the buoyancy ring 112. The buoyancy ring 112 includes the passage 120 configured to enable the releasable connector 118 to be releasably coupled to the releasable connector plug 216. The buoyancy ring 112 includes opening 218 that is formed around the antenna 214. A portion of the antenna 214 passes through opening 212 in the body 202 and is electrically coupled to the transmitter 226. The buoyancy ring 112 is configured to cause the deployable data recorder 108 to have an upright orientation in the water with the top plate 114 facing skyward.

The deployable data recorder 108 has one or more technical advantages of staying afloat through the use of the buoyancy ring 112, having a chamber 204 that is water resistant to protect the flight data, and being easy to visually detect from afar based on the buoyancy ring 112 having a vibrant color. Another technical advantage of the deployable data recorder 108 is that the power supply 224 (e.g., battery) is replaceable, which may simplify maintenance and reduce costs associated with maintenance of the aircraft 102.

Figure 3:
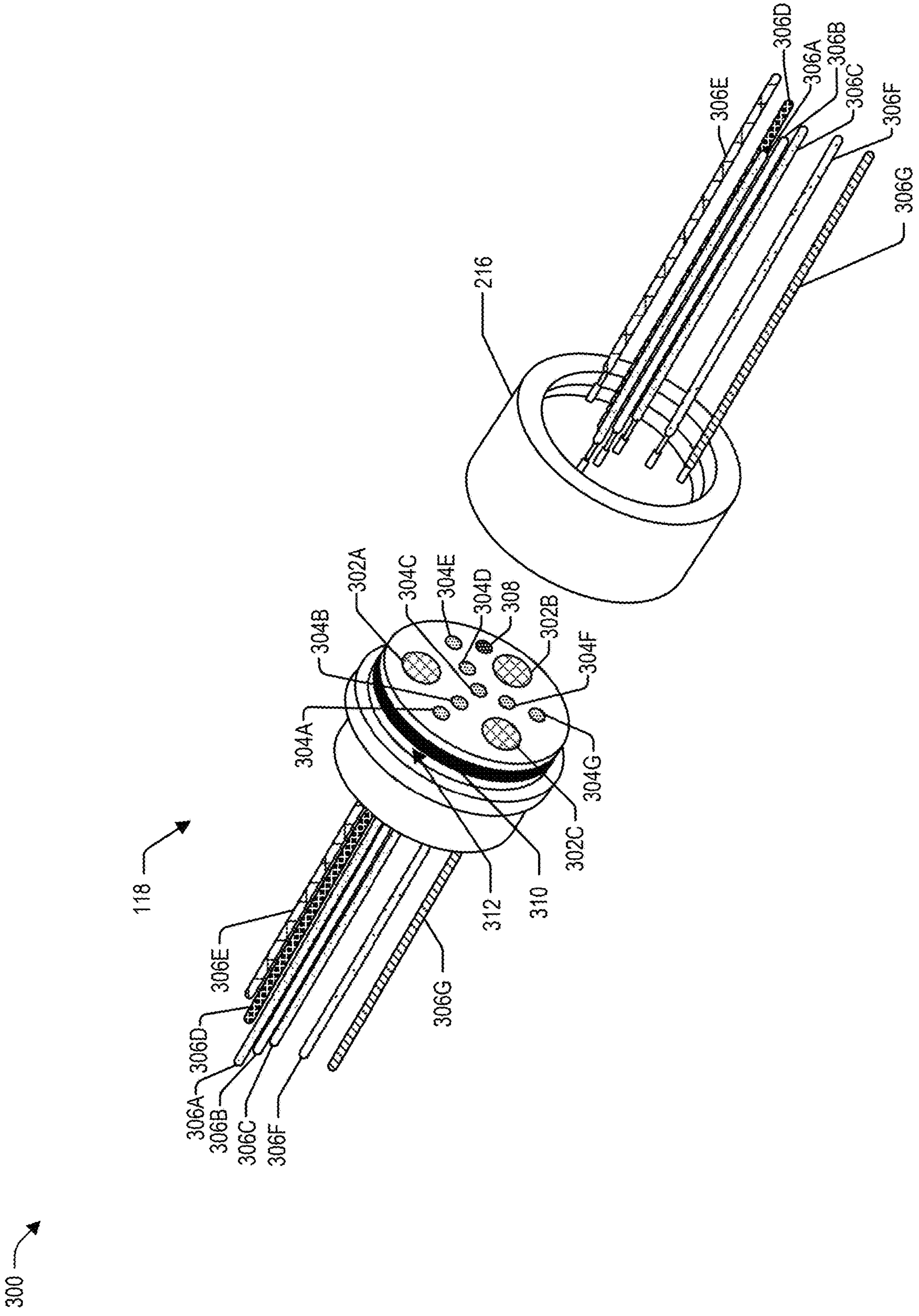
FIG. 3 is a particular implementation of a releasable connector for the deployable data recorder of FIG. 1 and a corresponding releasable connector plug of the aircraft.

FIG. 3 depicts a particular implementation 300 that illustrates the releasable connector 118 included with the deployable data recorder 108 of FIG. 1 and FIG. 2 and the releasable connector plug 216 of the aircraft 102. The releasable connector 118 is configured to be sealed to the opening 210 of the body 202. The releasable connector 118 is electrically coupled to the processor(s) 222. The releasable connector 118 is also configured to be releasably coupled to the releasable connector plug 216 (e.g., a data connection) of the aircraft 102 before inflation of the inflatable bag.

In one aspect, the releasable connector 118 is configured to be magnetically coupled to the releasable connector plug 216 via one or more magnets 302A-C coupling to a corresponding one or more magnets located on the releasable connector plug 216. In some implementations, the number of magnets 302 used can be fewer than three or more than three. The coupling of the connectors 118, 216 enables the processor(s) 222 to couple to a data system of the aircraft 102 to receive flight data associated with the aircraft. Receiving the flight data, power from the aircraft, pressure sensor data, and grounding of the deployable data recorder 108 occurs when one or more pins 304A-G of the releasable connector 118 are coupled with a corresponding one or more pins of the releasable connector plug 216. In an implementation, an opening 308 in the releasable connector 118 is configured to receive a corresponding rod extending from a face of the releasable connector plug 216 to ensure proper alignment of the releasable connector 118 relative to the releasable connector plug 216. In other implementations, proper alignment of the releasable connector 118 relative to the releasable connector plug 216 is implemented in another manner.

Each of the one or more pins 304A-G is coupled to one or more wires 306A-G, where each wire corresponds to a particular connection. For example, the pin 304A is coupled to the wire 306A (e.g., a ground connection) and when the releasable connector 118 is coupled to the releasable connector plug 216, this connection causes the deployable data recorder 108 to be grounded. In another example, the pin 304B is coupled to the wire 306B (e.g., power supply from the aircraft) and when the releasable connector 118 is coupled to the releasable connector plug 216 this connection causes the deployable data recorder 108 to receive power via the aircraft. In another example, the pin 304C is coupled to the wire 306C and when the releasable connector 118 is coupled to the releasable connector plug 216 this connection enables the deployable data recorder 108 to send the inflate signal to inflate the inflatable bag when the pressure sensor is submerged in water below the threshold depth. In another example, the pin 304D is coupled to the wire 306D and when the releasable connector 118 is coupled to the releasable connector plug 216 this connection enables the deployable data recorder 108 to receive pressure sensor data from the pressure sensor located in the aircraft. In another example, the pin 304E is coupled to the wire 306E and when the releasable connector 118 is coupled to the releasable connector plug 216 this connection enables the deployable data recorder 108 to receive flight data that includes recorded data sent to and received from various electronic systems on the aircraft 102, cockpit conversations and other sounds in the aircraft cockpit, as well as radio communications between personnel in the cockpit and others, or both. In another example, the pin 304F is coupled to the wire 306F and when the releasable connector 118 is coupled to the releasable connector plug 216 this connection provides a clock to the deployable data recorder and controls the flow of data to and from the deployable data recorder. In another example, the pin 304G is coupled to the wire 306G and when the releasable connector 118 is coupled to the releasable connector plug 216 this connection enables the deployable data recorder 108 to receive flight data that includes recorded data sent to and received from various electronic systems on the aircraft 102, cockpit conversations and other sounds in the aircraft cockpit, as well as radio communications between personnel in the cockpit and others, or both.

In some implementations, the releasable connector 118 includes an O-ring 310 on a body 312 of the releasable connector 118. The O-ring 310 may inhibit entry of moisture into joined together connectors 118, 216 that could disrupt the electrical connections between the releasable connector 118 and the releasable connector plug 216. The O-ring 310 may also inhibit unintended separation of the connectors 118, 216 when the connectors 118, 216 are joined together.

Figure 4:
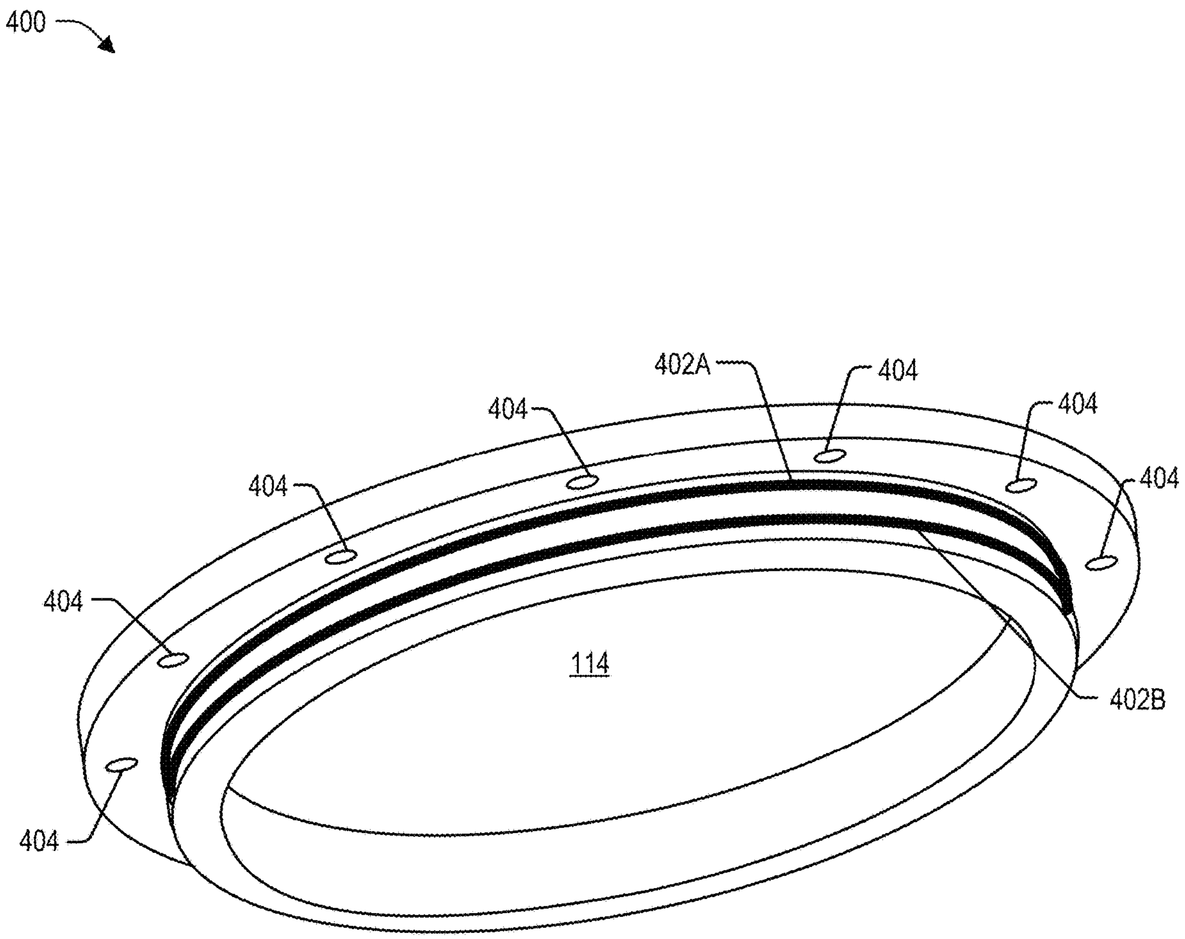
FIG. 4 is a diagram that illustrates a particular implementation of a top plate of the deployable data recorder of FIG. 1.

FIG. 4 is a diagram 400 that illustrates the top plate 114 of the deployable data recorder 108 of FIG. 1 and FIG. 2. The top plate 114 is configured to have an O-ring 402A that is positioned in a groove formed in the top plate 114 and an O-ring 402B that is positioned in a groove formed in the top plate 114. The O-rings 402 form a water-resistant seal between the chamber and water.

The top plate 114 includes a plurality of mounting holes 404. Fasteners (e.g., fasteners 116 of FIG. 2) positioned in the mounting holes 404 couple the top plate 114 to the body of the deployable data recorder. In some implementations, the top plate 114 can be affixed to the body using one or more interference fits, fasteners, adhesives, welding, and so forth. The affixation of the top plate 114 to the body can be reversible or irreversible.

A technical advantage of the top plate 114, as illustrated in FIG. 4, includes creating a water-resistant seal between the top plate 114 and the body such that water is unable to enter the chamber that houses electronics of the deployable data recorder 108.

Figure 5:
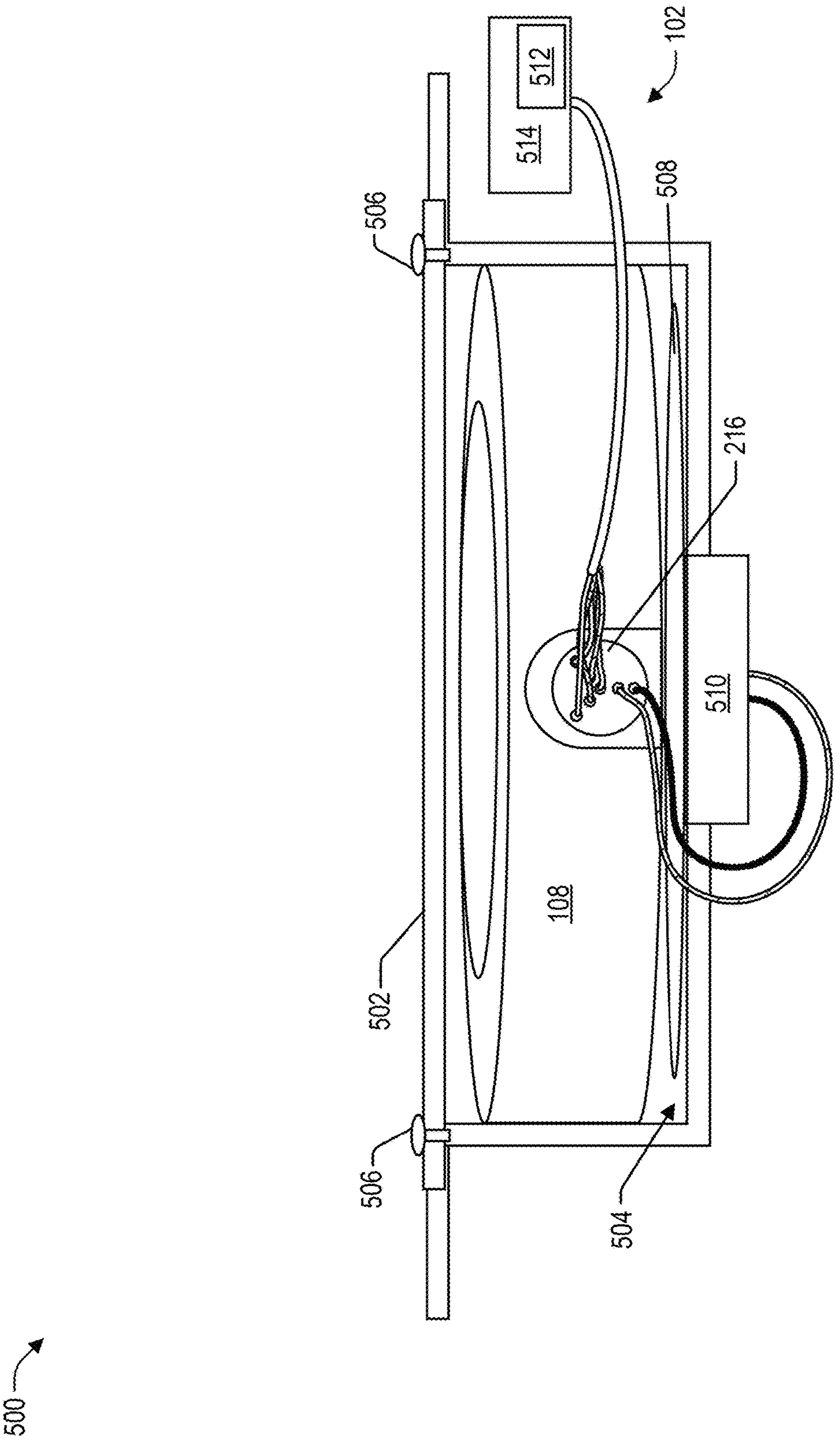
FIG. 5 is a particular implementation that represents the deployable data recorder of FIG. 1 located in a cavity of the aircraft prior to ejection.

FIG. 5 is a particular implementation 500 that represents the deployable data recorder 108 located in a compartment 504 of the aircraft 102 prior to ejection. The aircraft 102 is configured to include the compartment 504. Located within the compartment 504 is the deployable data recorder 108, the inflatable bag 508, the releasable connector plug 216 coupled to the releasable connector of the deployable data recorder 108, an inflator 510, or a combination thereof. A panel 502 can be placed over the compartment 504 and fasteners 506 can be used to secure the panel 502 to the aircraft 102 and therefore enclose the deployable data recorder 108 within the compartment 504.

In some implementations, the panel 502 includes a plurality of mounting holes. Fasteners 506 positioned in the mounting holes couple the panel 502 to the aircraft 102. In other implementations, a fuselage of the aircraft may be formed without panels 502. An exit member configured to rip through skin of the fuselage when an inflator 510 deploys may be positioned between the deployable data recorder 108 and the skin of the aircraft 102. The deployable data recorder systems 104, which each include a deployable data recorder 108, an exit member, and an inflatable bag, may be positioned in the interior of the fuselage and attached to support structure at desired locations during assembly of the aircraft.

As illustrated in FIG. 5, the releasable connector plug 216 is coupled to the releasable connector 118 (not shown) of the deployable data recorder 108. The coupling of the connectors 118, 216 enables the processor to couple to a data system 514 of the aircraft 102 to receive flight data associated with the aircraft. For example, the flight data includes recorded data sent to and received from various electronic systems on the aircraft 102, cockpit conversations and other sounds in the aircraft cockpit, as well as radio communications between personnel in the cockpit and others, or both. In response to receiving the flight data, the processor is configured to store the flight data in the memory device.

The inflator 510 is configured to inflate the inflatable bag 508 upon receiving an inflate signal from the deployable data recorder 108 responsive to pressure data received from the pressure sensor 512. The inflator 510 and the inflatable bag 508 can be an airbag system (e.g., an airbag system used in an automobile).

Figure 6:
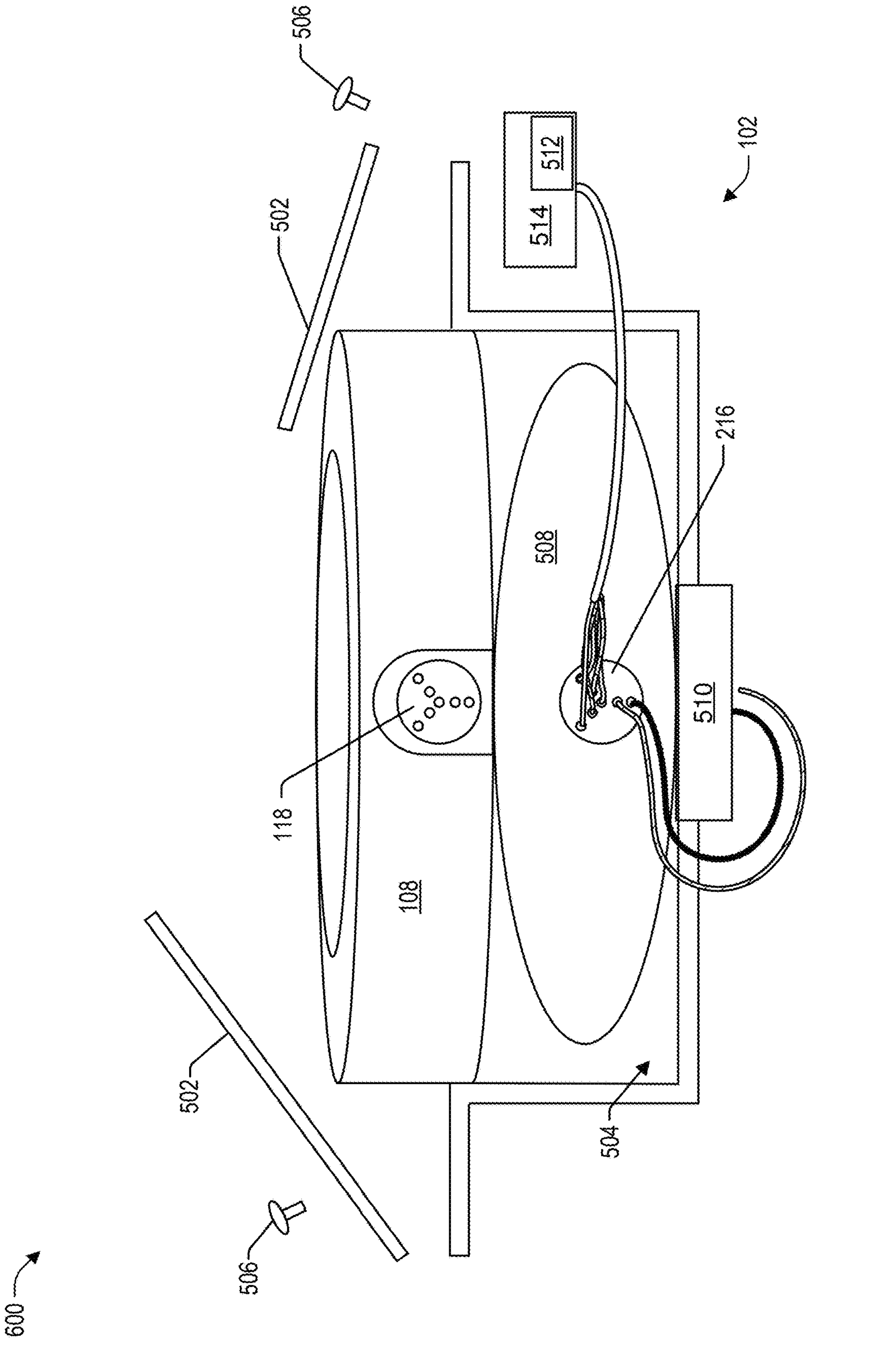
FIG. 6 is a particular implementation that represents the deployable data recorder of FIG. 5 being ejected from a cavity of the aircraft.

FIG. 6 is a particular implementation 600 that illustrates the deployable data recorder 108 being ejected from the cavity 504 of the aircraft 102. The pressure sensor 512 is coupled to the aircraft 102. The pressure sensor 512 is configured to generate pressure data and send the pressure data to a processor located within the deployable data recorder 108. In response to receiving the pressure data, the processor is configured to determine whether the pressure sensor 512 is submerged in water. When the processor determines that the pressure sensor 512 is submerged in the water at or below the threshold depth, the processor sends the signal to switch the power source from the aircraft 102 to the power source (e.g., battery) in the chamber 204 (not shown) of the deployable data recorder 108. The processor sends the inflate signal to the inflator 510 to cause inflation of the inflatable bag 508. The force applied to the deployable data recorder 108 by the inflatable bag 508 pushes the deployable data recorder 108 against the panel 502 and causes the panel 502, the fasteners 506, or both, to break. This breakage causes the deployable data recorder 108 to be ejected from the compartment 504. The force applied to the deployable data recorder 108 by the inflatable bag 508 is sufficient to push the deployable data recorder 108 away from the aircraft 102 so that the deployable data recorder 108 can rise to the surface of the water.

As illustrated in FIG. 6, the inflation of the inflation bag 508 causes the releasable connector 118 to disconnect from the releasable connector plug 216. Once this connection is disconnected, or after a particular delay time, the deployable data recorder 108 begins sending a data transmission, via the transmitter, to one or more receivers (e.g., satellites, a receiver on a search vehicle, etc.) to facilitate location of the deployable data recorder 108 based on the data transmission.

Figure 7:
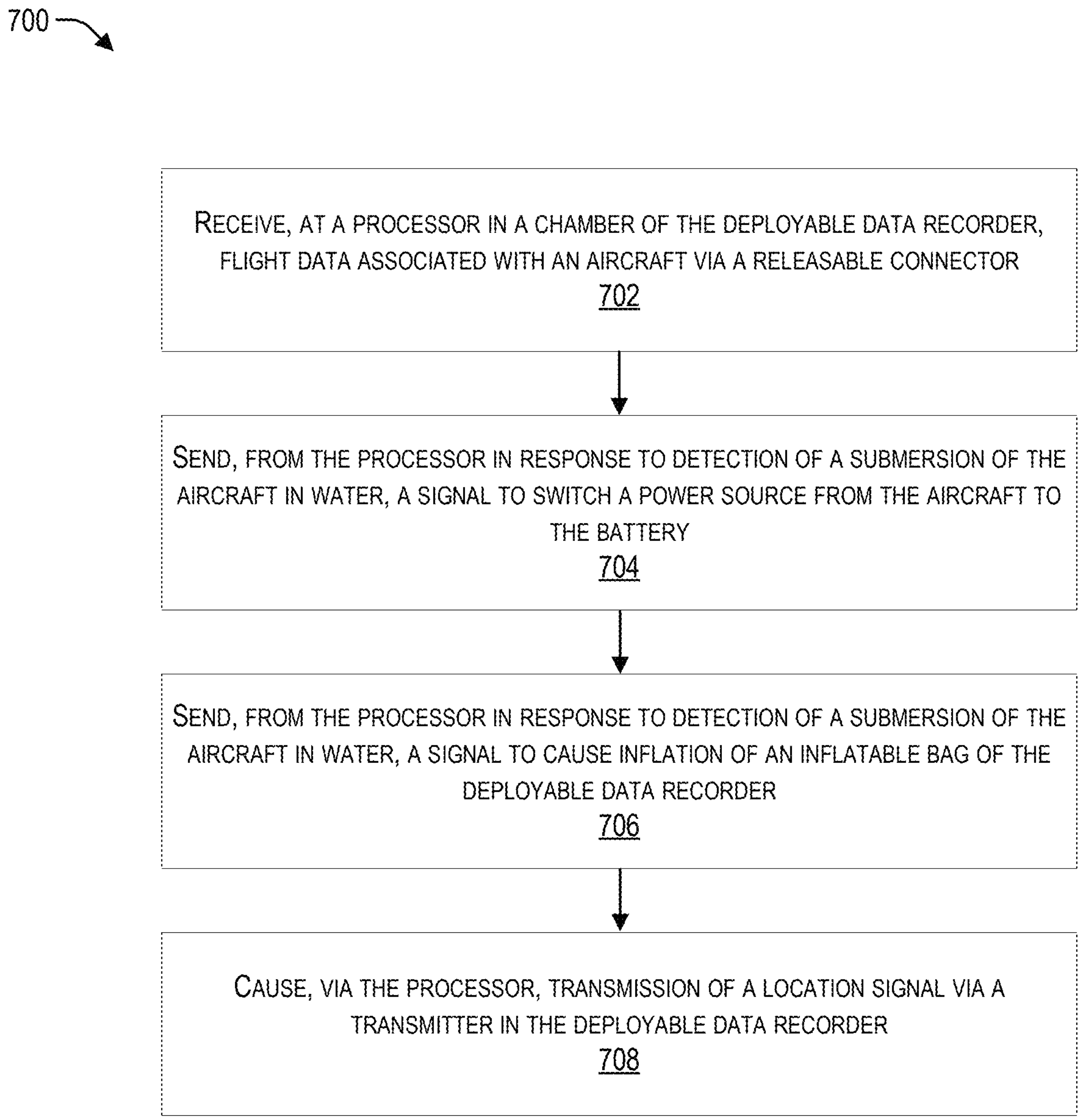
FIG. 7 is a flow chart of a method of use of a deployable data recorder.

FIG. 7 is a flow chart of a method 700 of use of a deployable data recorder system. The method 700 includes, at block 702, receiving, at a processor in a chamber of the deployable data recorder of the deployable data recorder system, flight data associated with an aircraft via a releasable connector. For example, the deployable data recorder 108 includes a releasable connector 118. The releasable connector 118 is electrically coupled to the processor(s) 222. The releasable connector 118 is also configured to be releasably coupled to a releasable connector plug 216 (e.g., a data connection) of the aircraft 102 before inflation of the inflatable bag 508. In one aspect, the releasable connector 118 is configured to magnetically couple to the releasable connector plug 216 of the aircraft 102. The coupling of the connectors 118, 216 enables the processor(s) 222 to couple to a data system 514 of the aircraft 102 to receive flight data associated with the aircraft 102. For example, the flight data includes recorded data sent to and received from various electronic systems on the aircraft 102, cockpit conversations and other sounds in the aircraft cockpit, as well as radio communications between personnel in the cockpit and others, or both. In response to receiving the flight data, the processor(s) 222 are configured to store the flight data in the memory device 228. In some implementations, the flight data is encrypted.

The method 700 includes, at block 704, sending, from the processor in response to detection of submersion of the aircraft in water, a signal to switch a power source from the aircraft to the battery. For example, when the processor(s) 222 determine that the pressure sensor 126 is submerged in the water below the threshold depth, the processor(s) 222 send the signal to switch a power source from the aircraft 102 to the power supply 224 (e.g., battery).

The method 700 includes, at block 706, sending, from the processor in response to detection of a submersion of the aircraft in water, a signal to cause inflation of an inflatable bag of the deployable data recorder. For example, the processor(s) 222 send the inflate signal to the inflator 510 to cause inflation of the inflatable bag 508. The force applied by the inflatable bag 508 to the deployable data recorder 108 causes ejection of the deployable data recorder 108 from the aircraft 102.

The method 700 includes, at block 708, causing, via the processor, transmission of a data transmission via a transmitter in the deployable data recorder. For example, the deployable data recorder 108 includes the transmitter 226 located in the chamber 204 and electrically coupled to the antenna 214 of the transmitter 226 located outside of the chamber 204 of the deployable data recorder 108. The transmitter 226 is configured to send, via the antenna 214, the data transmission to one or more receivers 124. The one or more receivers 124, upon receipt of the data transmission, determine and send location data to one or more search crews to begin searching for the deployable data recorder 108.

Figure 8:
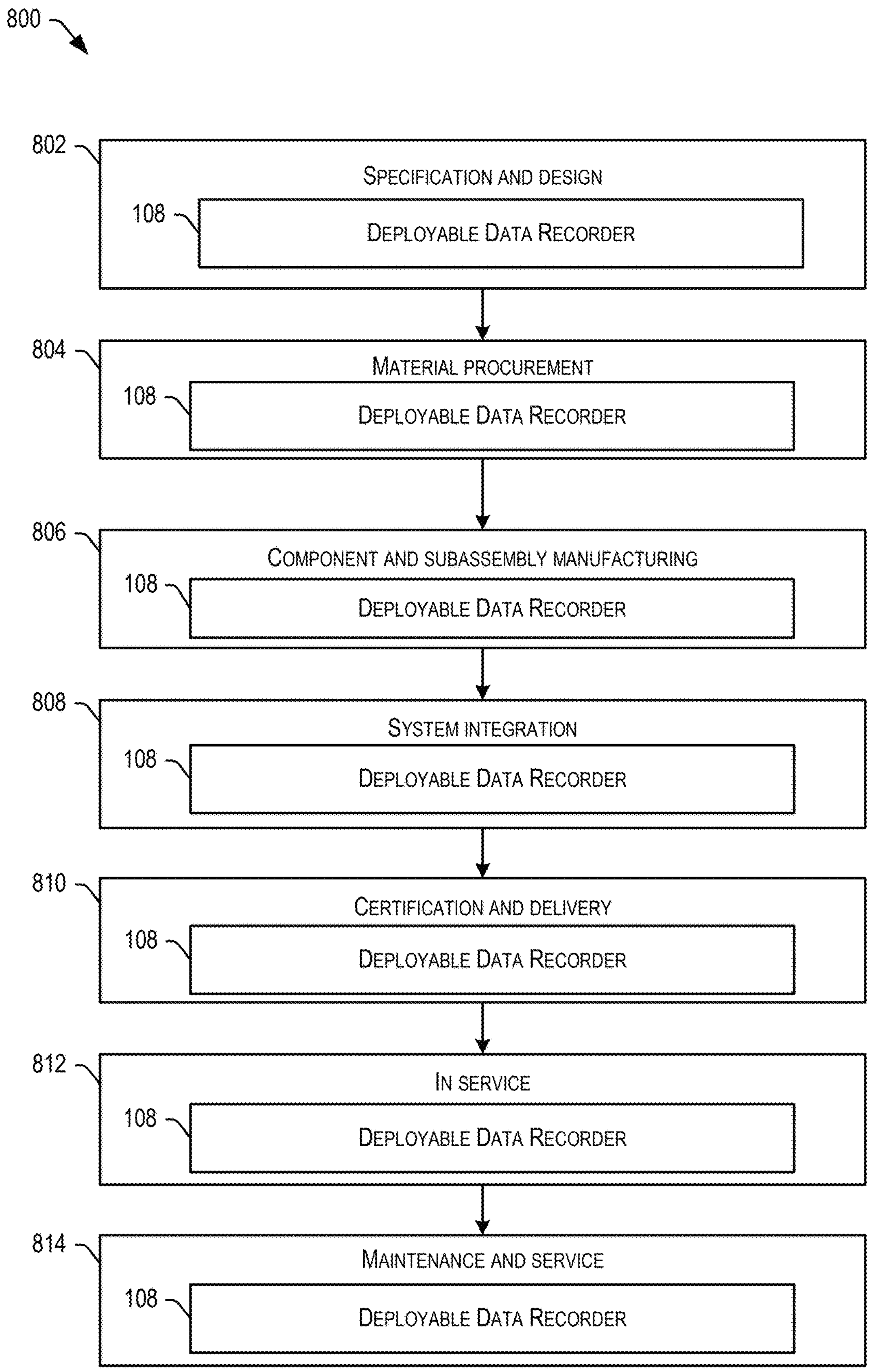
FIG. 8 is a flowchart illustrating an example of a life cycle of an aircraft that includes a deployable data recorder of FIG. 1.

FIG. 8 is a flowchart illustrating an example 800 of a life cycle of an aircraft that includes the deployable data recorders 108 of FIGS. 1, 5, and 6. During pre-production, the exemplary method 800 includes, at block 802, specification and design of the aircraft. During specification and design of the aircraft, the method 800 may include specification and design of the deployable data recorders 108 and locations where deployable data recorders 108 are to be placed. At block 804, the method 800 includes material procurement, which may include procuring materials for the deployable data recorders 108 or procuring pre-assembled deployable data recorders 108.

During production, the method 800 includes, at block 806, component and subassembly manufacturing and, at block 808, system integration of the aircraft. For example, the method 800 may include component and subassembly manufacturing of the deployable data recorders 108, system integration of the deployable data recorders 108 with the aircraft, or both. At block 810, the method 800 includes certification and delivery of the aircraft and, at block 812, placing the aircraft in service. Certification and delivery may include certification of the deployable data recorders 108 to place the deployable data recorders 108 in service. While in service by a customer, the aircraft may be scheduled for routine maintenance and service (which may also include modification, reconfiguration, refurbishment, and so on). At block 814, the method 800 includes performing maintenance and service on the aircraft, which may include performing maintenance and service on the deployable data recorder 108. For example, the maintenance and service can include replacing one or more of the electronic components 206, such as the power supply 224.

Each of the processes of the method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 9:
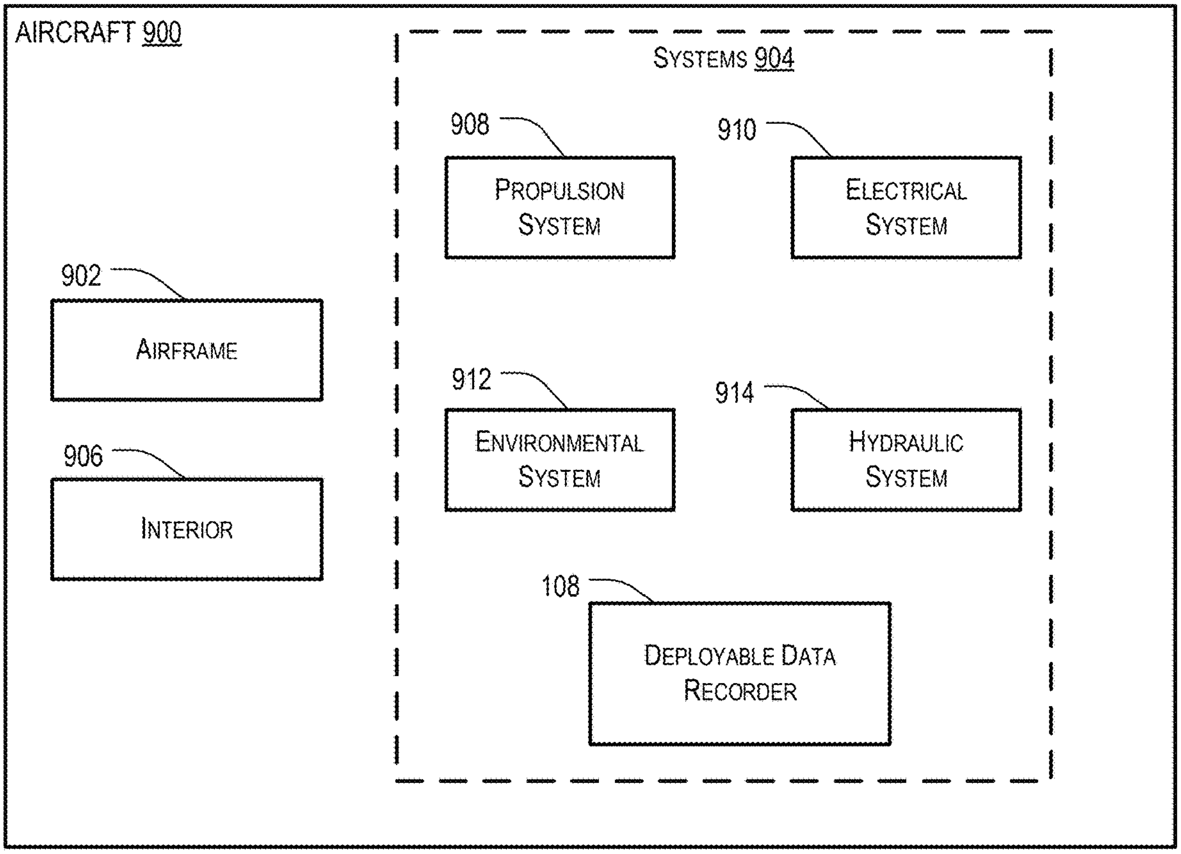
FIG. 9 is a block diagram illustrating aspects of an illustrative aircraft that includes a deployable data recorder of FIG. 1.

Aspects of the disclosure can be described in the context of an example of an aircraft 900 as shown in FIG. 9. In the example of FIG. 9, the aircraft 900 includes an airframe 902 with a plurality of systems 904 and an interior 906. Examples of the plurality of systems 904 include one or more of a propulsion system 908, an electrical system 910, an environmental system 912, a hydraulic system 914, and the deployable data recorders 108. Any number of other systems may be included. In the example of FIG. 9, the aircraft 900 includes the deployable data recorder 108 in accordance with one or more aspects of the disclosure as described in FIGS. 1-7. Portions of the deployable data recorders 108 are included in the airframe 902 and the interior 906. Also, the deployable data recorders 108 utilizes portions of the electrical system 910. For example, the deployable data recorder 108 may be powered by the electrical system 910 prior to being ejected.

FIG. 10 is a block diagram of a computing environment 1000 including a computing device 1010 configured to support aspects of computer-implemented methods and computer-executable program instructions (or code) according to the present disclosure. For example, the computing device 1010, or portions thereof, is configured to execute instructions to initiate, perform, or control one or more operations described with reference to FIGS. 1-7.

The computing device 1010 includes one or more processors 1020. The processor(s) 1020 are configured to communicate with system memory 1030, one or more storage devices 1040, one or more input/output interfaces 1050, one or more communications interfaces 1060, or any combination thereof. The system memory 1030 includes volatile memory devices (e.g., random access memory (RAM) devices), nonvolatile memory devices (e.g., read-only memory (ROM) devices, programmable read-only memory, and flash memory), or both. The system memory 1030 stores an operating system 1032, which may include a basic input/output system for booting the computing device 1010 as well as a full operating system to enable the computing device 1010 to interact with users, other programs, and other devices. The system memory 1030 stores system (program) data 1036, such as flight data 1012.

The system memory 1030 includes one or more operating systems 1032 and/or one or more applications 1034 (e.g., sets of instructions) executable by the processor(s) 1020. As an example, the one or more applications 1034 include instructions executable by the processor(s) 1020 to initiate, control, or perform one or more operations described with reference to FIGS. 1-7, such as receiving and storing flight data from an aircraft, receiving pressure signals from a pressure sensor, determining if the pressure sensor is below a threshold depth of water, changing a power source and causing inflation of an inflatable bag when a determination is that the pressure sensor is in water below the threshold depth.

In a particular implementation, the system memory 1030 includes a non-transitory, computer-readable medium storing the instructions that, when executed by the processor(s) 1020, cause the processor(s) 1020 to initiate, perform, or control operations to aid in design of an object. The operations include receiving flight data associated with an aircraft via a releasable connector; sending, from the processor 1020 in response to detection of a submersion of the aircraft in water, a signal to switch a power source from the aircraft to the batter, sending from the processor 1020 in response to detection of a submersion of the aircraft in water, a signal to cause inflation of an inflatable bag of the deployable data recorder, and cause, via the processor 1020, transmission of a location signal via a transmitter in the deployable data recorder.

The one or more storage devices 1040 include nonvolatile storage devices, such as magnetic disks, optical disks, or flash memory devices. In a particular example, the storage devices 1040 include both removable and non-removable memory devices. The storage devices 1040 are configured to store an operating system, images of operating systems, applications (e.g., one or more of the applications 1034), and program data (e.g., the program data 1036). In a particular aspect, the system memory 1030, the storage devices 1040, or both, include tangible computer-readable media. In a particular aspect, one or more of the storage devices 1040 are external to the computing device 1010.

The one or more input/output interfaces 1050 enable the computing device 1010 to communicate with one or more input/output devices 1070 to facilitate user interaction. For example, the one or more input/output interfaces 1050 can include a display interface, an input interface, or both. For example, the input/output interface 1050 is adapted to receive input from a user, to receive input from another computing device, or a combination thereof. In some implementations, the input/output interface 1050 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 1070 includes one or more user interface devices and displays, including some combination of buttons, keyboards, pointing devices, displays, speakers, microphones, touch screens, and other devices.

The processor(s) 1020 are configured to communicate with devices or controllers 1080 via the one or more communications interfaces 1060. For example, the one or more communications interfaces 1060 can include a network interface. In another example, the one or more devices or controllers 1080 includes the transmitter 226, the inflator, 510, the pressure sensor 512, or a combination thereof.

In some implementations, a non-transitory, computer-readable medium stores instructions that, when executed by one or more processors, cause the one or more processors to initiate, perform, or control operations to perform part or all of the functionality described above. For example, the instructions may be executable to implement one or more of the operations or methods of FIGS. 1-7. In some implementations, part, or all of one or more of the operations or methods of FIGS. 1-7 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Particular aspects of the disclosure are described below in sets of interrelated Examples:

According to Example 1, an apparatus associated with a vehicle, includes a body, wherein the body includes a chamber; a buoyancy ring coupled to the body; a battery located within the chamber; a transmitter, wherein a portion of the transmitter is disposed within a recess of the body; a processor located within the chamber and coupled to a memory device, wherein the processor is configured to receive a signal indicating detection of submersion of the vehicle in water; send a signal to switch a power source from the vehicle to the battery; send a signal to cause inflation of an inflatable bag; and cause the transmitter to send a data transmission.

Example 2 includes the apparatus of Example 1, further comprising a releasable connector disposed in a recess of the body, wherein the releasable connector is electrically coupled to the processor, and wherein the releasable connector is configured to be releasably coupled to a data connection of an aircraft before initiation of the inflation of the inflatable bag.

Example 3 includes the apparatus of Example 1 or Example 2, wherein the releasable connector is configured to magnetically couple to a corresponding releasable connector of the vehicle.

Example 4 includes the apparatus of any of Examples 2 to 3, wherein the releasable connector is configured to couple the processor to a data system of the vehicle to receive flight data associated with the vehicle.

Example 5 includes the apparatus of Example 4, wherein the processor is further configured to store the flight data in the memory device.

Example 6 includes the apparatus of any of Examples 1 to 5, wherein the body further comprises a top plate, and wherein the top plate comprises: a first groove configured to receive a first O-ring; a second groove configured to receive a second O-ring; and one or more openings configured to receive one or more fasteners to join the top plate to the body.

Example 7 includes the apparatus of any of Examples 1 to 6, wherein the buoyancy ring includes an opening configured to enable a releasable connector disposed in a recess of the body to be releasably coupled to a data connection of an aircraft.

Example 8 includes the apparatus of any of Examples 1 to 7, wherein the buoyancy ring includes an opening configured to surround a portion of the transmitter located outside of the body.

Example 9 includes the apparatus of any of Examples 1 to 8, wherein the buoyancy ring has a vibrant color to facilitate visual detection of the apparatus.

Example 10 includes the apparatus of any of Examples 1 to 9, wherein the buoyancy ring includes infrared patches located on a surface of the buoyancy ring.

Example 11 includes the apparatus of any of Examples 1 to 10, wherein the buoyancy ring is configured to cause the body to have an upright orientation in the water.

Example 12 includes the apparatus of any of Examples 1 to 11 and further includes a casing configured to encase a portion of the transmitter located outside of the body.

According to Example 13, a system includes an aircraft; and a plurality of deployable data recorder systems coupled to the aircraft, wherein each of the plurality of deployable data recorder systems is located at a different location of the aircraft, and wherein each of the plurality of deployable data recorder systems comprises: a body that includes a chamber; a buoyancy ring coupled to the body; a transmitter, wherein a portion of the transmitter is disposed within a recess of the body; a processor located within the chamber and coupled to a memory device, wherein the processor is configured to receive a signal indicating detection of submersion of the aircraft in water; send a signal to switch a power source from the aircraft to the battery; send a signal to cause inflation of an inflatable bag; and cause the transmitter to send a data transmission.

Example 14 includes the system of Example 13, wherein each of the plurality of deployable data recorder systems further comprises a releasable connector configured to couple the processor to a data system of the aircraft to receive flight data associated with the aircraft for storage in the memory device.

Example 15 includes the system of Example 13 or Example 14, wherein the releasable connector is magnetic and further comprises one or more pins to enable the processor to receive the flight data associated with the aircraft from the data system.

Example 16 includes the system of any of Examples 13 to 15 and further includes a pressure sensor located in the aircraft to generate the signal.

Example 17 includes the system of any of Examples 13 to 16, wherein the aircraft includes a plurality of cavities, and wherein each of the plurality of deployable data recorder systems and the inflatable bag are located within an individual cavity of the plurality of cavities.

Example 18 includes the system of any of Examples 13 to 17, wherein the body further comprises a top plate, and wherein the top plate comprises: a first groove configured to receive a first O-ring; a second groove configured to receive a second O-ring; and one or more openings configured to receive one or more fasteners to join the top plate to the body.

According to Example 19, a method of use of a deployable data recorder, the method includes receiving, at a processor in a chamber of the deployable data recorder, flight data associated with an aircraft via a releasable connector; sending, from the processor in response to detection of a submersion of the aircraft in water, a signal to switch a power source from the aircraft to the battery; sending, from the processor in response to detection of a submersion of the aircraft in water, a signal to cause inflation of an inflatable bag of the deployable data recorder; and causing, via the processor, transmission of a data transmission via a transmitter in the deployable data recorder.

Example 20 includes the method of Example 19, wherein inflation of the inflatable bag is configured to cause separation of the deployable data recorder from the releasable connector and separation of the deployable data recorder from the aircraft.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An apparatus associated with a vehicle, comprising:
- a body, wherein the body includes a chamber;
- a buoyancy ring coupled to the body, wherein the buoyancy ring includes an opening configured to enable a releasable connector disposed in a recess of the body to be releasably coupled to a data connection of the vehicle;
- a battery located within the chamber;
- a transmitter, wherein a portion of the transmitter is disposed within the recess of the body; and
- a processor located within the chamber and coupled to a memory device, wherein the processor is configured to:
  - receive a signal indicating detection of submersion of the vehicle in water;
  - send a signal to switch a power source from the vehicle to the battery;
  - send a signal to cause inflation of an inflatable bag; and
  - cause the transmitter to send a data transmission.

2. The apparatus of claim 1, wherein the releasable connector is electrically coupled to the processor, and wherein the data connection with the vehicle is before initiation of the inflation of the inflatable bag.

3. The apparatus of claim 2, wherein the releasable connector is configured to magnetically couple to a corresponding releasable connector of the vehicle.

4. The apparatus of claim 2, wherein the releasable connector is configured to couple the processor to a data system of the vehicle to receive flight data associated with the vehicle.

5. The apparatus of claim 4, wherein the processor is further configured to store the flight data in the memory device.

6. The apparatus of claim 1, wherein the body further comprises a top plate, and wherein the top plate comprises:
- a first groove configured to receive a first O-ring;
- a second groove configured to receive a second O-ring; and
- one or more openings configured to receive one or more fasteners to join the top plate to the body.

7. The apparatus of claim 1, wherein the releasable connector is configured to magnetically couple to a corresponding releasable connector of the vehicle.

8. The apparatus of claim 1, wherein the buoyancy ring includes an opening configured to surround a portion of the transmitter located outside of the body.

9. The apparatus of claim 1, wherein the buoyancy ring has a vibrant color to facilitate visual detection of the apparatus.

10. The apparatus of claim 1, wherein the buoyancy ring includes infrared patches located on a surface of the buoyancy ring.

11. The apparatus of claim 1, wherein the buoyancy ring is configured to cause the body to have an upright orientation in the water.

12. The apparatus of claim 1, further comprising a casing configured to encase a portion of the transmitter located outside of the body.

13. A system comprising:
- an aircraft; and
- a plurality of deployable data recorder systems coupled to the aircraft, wherein each of the plurality of deployable data recorder systems is located at a different location of the aircraft, and wherein each of the plurality of deployable data recorder systems comprises:
  - a body that includes a chamber;
  - a buoyancy ring coupled to the body, wherein the buoyancy ring includes an opening configured to enable a releasable connector disposed in a recess of the body to be releasably coupled to a data connection of the aircraft;
  - a battery located in the chamber;
  - a transmitter, wherein a portion of the transmitter is disposed within the recess of the body; and
  - a processor located within the chamber and coupled to a memory device, wherein the processor is configured to:
    - receive a signal indicating detection of submersion of the aircraft in water;
    - send a signal to switch a power source from the aircraft to the battery;
    - send a signal to cause inflation of an inflatable bag; and
    - cause the transmitter to send a data transmission.

14. The system of claim 13, wherein the processor is further configured to receive flight data associated with the aircraft for storage in the memory device.

15. The system of claim 14, wherein the releasable connector is magnetic and further comprises one or more pins configured to enable the processor to receive the flight data associated with the aircraft from a data system.

16. The system of claim 13, further comprising a pressure sensor located in the aircraft and configured to generate the signal.

17. The system of claim 13, wherein the aircraft includes a plurality of cavities, and wherein each of the plurality of deployable data recorder systems and the inflatable bag are located within an individual cavity of the plurality of cavities.

18. The system of claim 13, wherein the body further comprises a top plate, and wherein the top plate comprises:
- a first groove configured to receive a first O-ring;

a second groove configured to receive a second O-ring; and one or more openings configured to receive one or more fasteners to join the top plate to the body.

19. The system of claim 13, wherein the buoyancy ring of each of the plurality of deployable data recorder systems has a vibrant color to facilitate visual detection of the plurality of deployable data recorder systems.

20. The system of claim 13, wherein the buoyancy ring of each of the plurality of deployable data recorder systems is configured to cause the body to have an upright orientation in the water.

* * * * *